(12) United States Patent
Li et al.

(10) Patent No.: US 12,146,630 B2
(45) Date of Patent: Nov. 19, 2024

(54) LIGHT EMITTING ASSEMBLY, VEHICLE LIGHT, AND VEHICLE

(71) Applicant: VALEO VISION, Bobigny (FR)

(72) Inventors: Yilin Li, Hubei (CN); Yan Sun, Hubei (CN); Delu Peng, Hubei (CN); Nao Chen, Hubei (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 18/264,530

(22) PCT Filed: Feb. 9, 2022

(86) PCT No.: PCT/CN2022/075598
§ 371 (c)(1),
(2) Date: Aug. 7, 2023

(87) PCT Pub. No.: WO2022/171107
PCT Pub. Date: Aug. 18, 2022

(65) Prior Publication Data
US 2024/0125445 A1    Apr. 18, 2024

(30) Foreign Application Priority Data

Feb. 9, 2021 (CN) .......................... 202120361989.4

(51) Int. Cl.
*F21S 41/143* (2018.01)
*F21S 41/153* (2018.01)
(Continued)

(52) U.S. Cl.
CPC ........... *F21S 41/334* (2018.01); *F21S 41/143* (2018.01); *F21S 41/153* (2018.01); *F21S 41/39* (2018.01)

(58) Field of Classification Search
CPC ...... F21S 41/334; F21S 41/143; F21S 41/153; F21S 41/39
See application file for complete search history.

(56) References Cited

U.S. PATENT DOCUMENTS 6,089,735 A    7/2000   Lee
8,967,843 B2   3/2015   Jack et al.
(Continued)

FOREIGN PATENT DOCUMENTS

CN    103261780 A    8/2013
CN    104428585 A    3/2015
(Continued)

OTHER PUBLICATIONS

English translation of Joeng KR-20170066913-A, published 2017 (Year: 2017).*
(Continued)

*Primary Examiner* — Evan P Dzierzynski
(74) *Attorney, Agent, or Firm* — Oblon, McClelland, Maier & Neustadt, L.L.P.

(57) ABSTRACT

A light emitting assembly, a vehicle light, and a vehicle. The light emitting assembly comprises a reflector unit and a light emitting unit; the light emitting unit is provided with a carrier and a light source mounted on the carrier, and a reflecting surface is provided on one side of the reflector unit, to reflect light emitted by the light source, wherein the light emitting unit is connected to the side of the reflector unit opposite to the reflecting surface by means of the carrier and the reflector unit.

18 Claims, 4 Drawing Sheets

(51) Int. Cl.
*F21S 41/33* (2018.01)
*F21S 41/39* (2018.01)

(56) References Cited

U.S. PATENT DOCUMENTS

| | | | |
|---|---|---|---|
| 9,458,976 B2 | 10/2016 | Krenn et al. | |
| 9,841,158 B2 | 12/2017 | Bauer et al. | |
| 10,247,379 B2 | 4/2019 | Grafeneder et al. | |
| 10,578,267 B2 * | 3/2020 | Bowles | F21S 45/49 |
| 2011/0157907 A1 * | 6/2011 | Hwang | B60R 1/1207 |
| | | | 362/494 |
| 2013/0215632 A1 * | 8/2013 | Jackl | F21S 45/48 |
| | | | 362/514 |
| 2015/0204503 A1 | 7/2015 | Krenn et al. | |
| 2015/0241011 A1 * | 8/2015 | Bauer | F21S 41/336 |
| | | | 362/514 |
| 2017/0292669 A1 | 10/2017 | Grafeneder et al. | |
| 2019/0383472 A1 * | 12/2019 | Mertens | B26F 1/40 |
| 2020/0080708 A1 * | 3/2020 | Xiao | F21V 17/164 |

FOREIGN PATENT DOCUMENTS

| | | |
|---|---|---|
| CN | 104685291 A | 6/2015 |
| CN | 106687741 A | 5/2017 |
| CN | 111433511 A | 7/2020 |
| CN | 111486407 A | 8/2020 |
| CN | 215001388 U | 12/2021 |
| EP | 1 520 135 A1 | 4/2005 |
| KR | 10-2017-0066913 | 6/2017 |
| KR | 20170066913 A * | 6/2017 |
| KR | 20170075470 A * | 7/2017 |

OTHER PUBLICATIONS

English translation of Kim KR-20170075470-A, published 2017 (Year: 2017).*

International Search Report Issued May 10, 2022, in PCT/CN2022/075598, filed on Feb. 9, 2022, 4 pages.

* cited by examiner

LIGHT EMITTING ASSEMBLY, VEHICLE LIGHT, AND VEHICLE

TECHNICAL FIELD

The present invention relates to a light emitting assembly, a vehicle light and a vehicle.

BACKGROUND ART

Light emitting assemblies with reflector units and light emitting units are already known. In such a light emitting assembly, it should be ensured that the reflector unit and the light emitting unit have the correct positions relative to each other. For this purpose, for example, the reflector unit and the light emitting unit may each be held on a common support by means of additional fasteners, for example, screws.

SUMMARY OF THE INVENTION

Therefore, the purpose of the present invention is to provide a light emitting assembly with a reflector unit and a light emitting unit, which can realize simple installation by a simple structure.

According to the present invention, the purpose is achieved in that the light emitting unit of the light emitting assembly has a carrier and a light source mounted on the carrier, the reflector unit is provided with a reflecting surface on one side to reflect light emitted by the light source, wherein the light emitting unit is connected to the reflector unit on a side of the reflector unit opposite to the side provided with the reflecting surface by means of the carrier by a snap-fit structure. Thus, a simple snap-fit connection between the reflector unit and the light emitting unit can be established, without additional connecting elements, or at least reducing the number of additional connecting elements required.

According to an embodiment of the present invention, the carrier is plate-shaped, a protrusion is provided on the edge of the carrier, the reflector unit has an elastic piece, and a through hole is provided in a top section of the elastic piece to accommodate the protrusion. The carrier is, for example, a printed circuit board, in particular a rigid printed circuit board, and the base material thereof may include epoxy resin, fiberglass, etc. The thickness of the carrier is, for example, between 0.5 mm and 6.4 mm. Because printed circuit boards are readily available on the market, using a printed circuit board as the carrier is particularly cost-effective.

According to an embodiment of the present invention, the top section is curved away from the carrier. In this case, especially when the connection between the carrier and the reflector unit is established only by means of a protrusion on the carrier that protrudes into a through hole in the elastic piece, such a curved top section of the carrier will facilitate the introduction of the protrusion on the carrier into the through hole as the top edge of the protrusion extends from the through hole. The elastic piece has an elastic deformation in the direction away from the carrier before the protrusion finally fits into the through hole. After the protrusion fits into the through hole, the elastic piece is reinstated, thereby limiting the carrier at least in the normal direction of the carrier.

According to the embodiments of the present invention, the carrier is provided with a plurality of protrusions, which are spaced on the edge of the carrier, wherein the number and arrangement of the elastic pieces with the through holes provided on the reflector unit correspond to the number and arrangement of the protrusions, for stable positioning.

According to the embodiments of the present invention, the carrier has a first through hole, and the reflector unit has a hook, which can pass through the through hole and hook onto the carrier. The hook is also elastically deformable, i.e., elastically deforms during the process of the hook passing through the through hole in the carrier, and is reinstated after passing through the through hole.

According to the embodiments of the present invention, the reflector unit has a supporting portion to support the carrier. A predetermined distance between the carrier and the reflector unit can be defined by the supporting portion, for example, to prevent damage to the electronic components on the carrier due to possible contact with the reflector unit.

According to the embodiments of the present invention, the reflector unit has a protruding pin, the carrier has a second through hole, and the protruding pin passes through the second through hole to hold the carrier in place. The outer contour of the protruding pin matches the inner contour of the through hole, so that the reflector unit can be fixed relative to the carrier in the direction of extension of the carrier plane.

According to the embodiments of the present invention, the reflector unit is in one piece. For example, the reflector unit may be injection molded, and the elastic piece, protruding pin and supporting portion described above are formed during the injection molding process, which allows for simple assembly.

According to another aspect of the present invention, a vehicle light is provided, which has the light emitting assembly described above.

According to yet another aspect of the present invention, a vehicle is provided, which has the light emitting assembly described above or the vehicle light described above.

BRIEF DESCRIPTION OF THE DRAWINGS

The present invention is further explained below with the aid of the drawings. In the drawings.

SPECIFIC EMBODIMENTS

Figure 1:
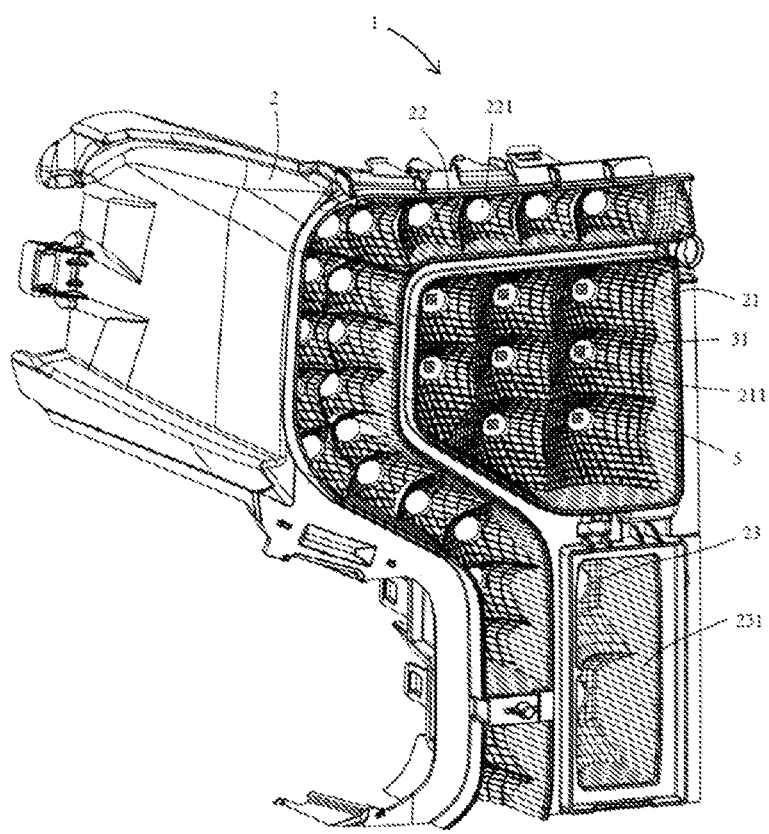
FIG. 1 is a space view of the light emitting assembly according to the present invention.

Embodiments of the present invention are exemplarily described below. As those skilled in the art should realize, the embodiments described may be amended in various ways without departing from the concept of the present invention. Thus, the accompanying drawings and the description are in essence demonstrative and non-limiting. In the description below, the same reference numerals generally denote functionally identical or similar elements.

FIG. 1 exemplarily shows the light emitting assembly 1 according to the present invention, which has a reflector unit 2 and a light emitting unit 3.

The light emitting assembly 1 may be used, for example, in vehicle lights such as the headlight or the tail light, for lighting and/or signaling functions, for example, as low beam, high beam, turn signals, brake light, fog light, reversing light, and side light; the light emitting assembly may also be used in interior lights. For this, when the reflector unit 2 is used for a plurality of light functions, the reflecting surface 5 of the reflector unit 2 is divided into different reflection regions. For example, three reflection regions 21, 22 and 23 are shown in FIG. 1, each of the reflection regions may have a plurality of reflection chambers 211, 221 and 231, and the reflection chambers of a reflection region may be arranged in an array or along a linear direction, for a planar or a linear lighting effect. A light source 31 of the light emitting unit 3 is assigned to each reflection chamber, wherein the light sources 31 assigned to the reflection regions may have different light colors or intensities. Here, the light source 31 is preferably a semiconductor light source, for example, a light-emitting diode, such as a light-emitting diode that can emit white light, yellow light, red light, or light of other colors. According to actual needs, the corresponding light sources 31 are arranged in a reflection region. In this example, a reflection chamber of a reflection region is in the shape of a bowl with a hollow bottom, and the light source 31 is arranged at the bottom of the reflection chamber.

Figure 2:
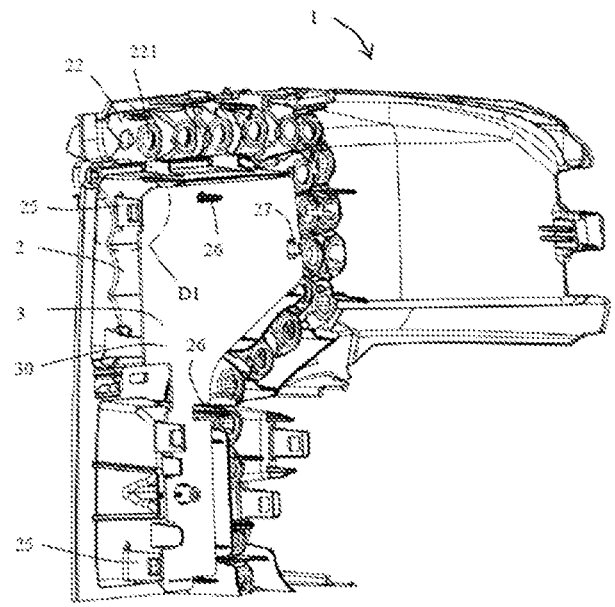
FIG. 2 is another space view of the light emitting assembly in FIG. 1.

FIG. 2 is a back space view of the light emitting assembly 1 in FIG. 1. It can be seen that the carrier 30 of the light emitting unit 3 is arranged on the reflector unit 2, i.e., the carrier 30 is arranged on the side of the reflector unit 2 opposite to the side on which the reflecting surface 5 is provided. The carrier 30 is a plate with planar extension, for example a printed circuit board. The light sources 31 are arranged on the carrier 30. The light sources assigned to different reflection regions may be arranged on the same carrier 30. The light emitting assembly 1 is fixed on the reflector unit 2 by a corresponding structure, which will be further described below.

Figure 3:
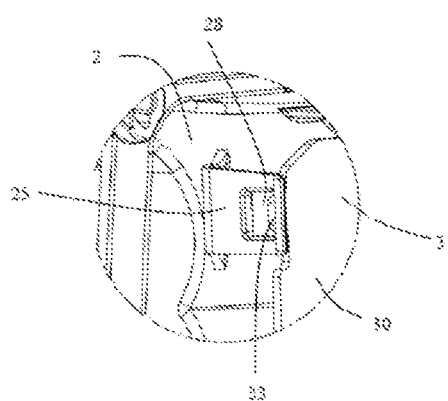
FIG. 3 is a detail view of area D1 in FIG. 2.
Figure 4:
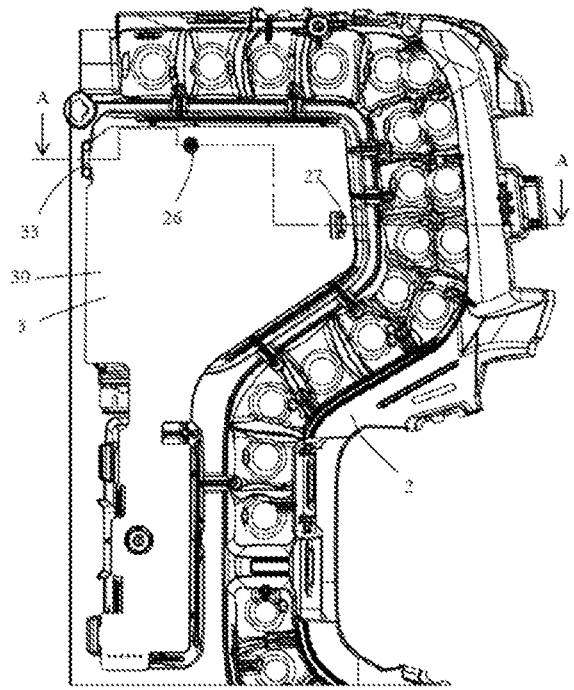
FIG. 4 is a back view of the light emitting assembly in FIG. 1.
Figure 5:
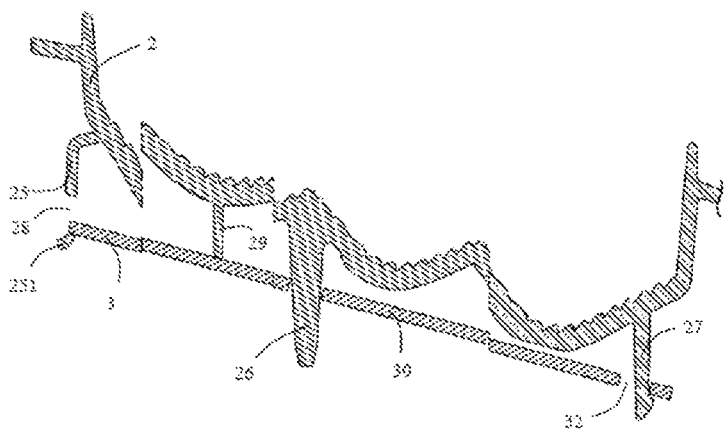
FIG. 5 is a section view along the cross-section A-A in FIG. 5.
Figure 6:
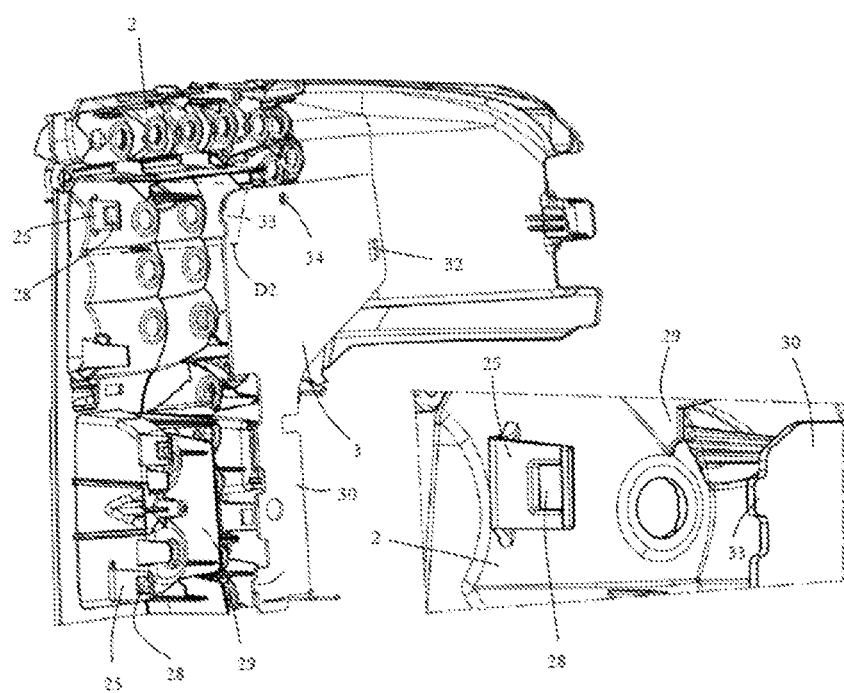
FIG. 6 is an exploded view of the light emitting assembly in FIG. 1, wherein a detail view of the area D2 is also shown.

As can be seen from the detail view of the area D1 of FIG. 2 as shown in FIG. 3 in combination with FIG. 6, a elastic piece 25 protruding from the reflector unit 2 is provided on the side of the reflector unit 2 facing away from the reflecting surface 5. The elastic piece 25 is wall-shaped, and a through hole 28 is provided in the top section 251. A protrusion 33 provided on the edge of the carrier 30 protrudes into and extends from the through hole 28, wherein the protrusion 33 is in the form of a lug, and its surface facing the top section 251 of the carrier 30 is in contact with the inner wall of the through hole 28. The top section 251 of the elastic piece 25 is curved away from the carrier 30 (also with reference to FIG. 5).

The carrier 30 may be provided with a plurality of protrusions 33, which are spaced on the edge of the carrier 30. The reflector unit 2 may also be provided with a plurality of elastic pieces 25. The number and arrangement of the elastic pieces 25 with the through holes 28 provided on the reflector unit 2 correspond to the number and arrangement of the protrusions 33.

Alternatively or additionally, the carrier 30 has a first through hole 32, the reflector unit 2 has a hook 27, and the hook 27 can pass through the through hole 32 and hook onto the carrier 30. The hook 27 is also elastically deformable. The size of the through hole 32 is designed such that the hook 27 can be deformed within a given range. The number and arrangement of the first through holes 32 and the hooks 27 may also be determined as required.

The carrier 30 has a second through hole 34, and the reflector unit 2 has a protruding pin 26 protruding from the second through hole 34 to hold the carrier 30 in place. The size of the protruding pin 26 matches the size of the second through hole 34. The protruding pin 26 may be a cylindrical pin or a cross pin, etc. Movement of the carrier 30 can thus be prevented in a direction extending transversely to the plane of the carrier 30.

The reflector unit 2 has a supporting portion 29 to support the carrier 30. The supporting portion 29 may be in the shape of a thin wall, and its top region for supporting the carrier is flat. For this, the carrier 30 may be placed on the supporting portion 29 on the side on which the light sources are mounted. The distance between the portion of the supporting portion 29 in contact with the carrier 30 and the portion of the through hole 28 in contact with the protrusion 33 of the carrier 30 may be slightly smaller than the thickness of the carrier 30 itself, thereby preventing the carrier 30 from moving along the normal direction of the carrier 30 after the connection between the carrier 30 and the elastic piece 25 and the hook 27 of the reflector unit 2 is established.

In the case where the reflector unit 2 has a plurality of reflection regions, the supporting portion 29 may be arranged between the reflection regions to serve as the spacer for different reflection regions, thereby preventing light from a light source for one reflection region from entering another reflection region.

The carrier 30 of the proposed light emitting unit 3 may establish a connection with the reflector unit 2 only by means of the protrusion 33 or the hook 27 described above, or establish a connection with the reflector unit 2 by means of the combination of the protrusion 33 and the hook 27. FIG. 5 is a section view of the connection between the reflector unit 2 and the light emitting unit 3 by means of the combination of the protrusion 33 and the hook 27. Where necessary, additional connecting elements may also be used, for example, screw elements, which are screwed through holes in the carrier 30 into bosses of the reflector unit 2 provided with cylindrical holes.

Preferably, the reflector unit 2 is in one piece. For example, the reflector unit 2 may be injection molded with, for example, a polycarbonate (PC), etc. The elastic pieces, hooks and supporting portion described above are formed during the injection molding process, and they are connected to the body of the reflector unit 2.

To mount the light emitting unit 3 on the reflector unit 2, the light emitting unit 3 may be placed on the reflector unit 2 on the side facing away from the reflecting surface of the reflector unit 2, wherein the protruding pin 26 is aligned with the corresponding through hole, so that the protrusion 33 and/or through hole 32 of the carrier 30 of the light emitting unit 3 occupy an initial position corresponding to the elastic piece 25 and/or the hook 27 of the reflector unit. During the process of mounting by pushing, the front edge of the protrusion 33 slides along the inside of the curved top section 251 of the elastic piece 25, so that the elastic piece 25 is elastically deformed, and/or the hump of the hook 27 contacts the edge of the through hole 32 and is elastically deformed. After the protrusion 33 enters the through hole 28 of the elastic piece 25, and/or after the hook 27 hooks onto the carrier 30, the elastic piece 25 and/or the hook 27 are(is) reinstated, thereby establishing a snap-fit connection.

The light emitting assembly 1 described above may be used in a vehicle light. Therefore, the light emitting assembly 1 is contained in the housing of a vehicle light. The vehicle light may be a lighting and/or signalling light, including but not limited to, a headlight or tail light.

The present invention, instead of being limited to the above-described structures, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims only.

The invention claimed is:

1. A light emitting assembly, comprising:
   a light emitting unit having a carrier and a light source mounted on the carrier, and
   a reflector unit being provided with a reflecting surface on one side to reflect light emitted from the light source, wherein
   the light emitting unit is connected to the reflector unit on a side of the reflector unit opposite to the side provided with the reflecting surface by means of the carrier by a snap-fit structure,
   the reflector unit has a protruding pin,
   the carrier has a first through hole, and
   the protruding pin passes through and extends beyond the first through hole to hold the carrier in place.

2. The light emitting assembly as claimed in claim 1, wherein:
   the carrier is plate-shaped,
   a protrusion is provided on an edge of the carrier,
   the reflector unit has an elastic piece, and
   a second through hole is provided in a top section of the elastic piece to accommodate the protrusion.

3. The light emitting assembly as claimed in claim 2, wherein the top section is curved away from the carrier.

4. The light emitting assembly as claimed in claim 3, wherein the carrier is provided with a plurality of protrusions, which are spaced on the edge of the carrier, wherein the number and arrangement of the elastic pieces with through holes provided on the reflector unit correspond to the number and arrangement of the protrusions.

5. The light emitting assembly as claimed in claim 3, wherein:
   the carrier has a third through hole,
   the reflector unit has a hook, and
   the hook can pass through the third through hole and hook onto the carrier.

6. The light emitting assembly as claimed in claim 3, wherein the reflector unit has a supporting portion to support the carrier.

7. The light emitting assembly as claimed in claim 3, wherein the reflector unit is a one-piece design.

8. The light emitting assembly as claimed in claim 2, wherein:
   the carrier has a third through hole,
   the reflector unit has a hook, and
   the hook can pass through the third through hole and hook onto the carrier.

9. The light emitting assembly as claimed in claim 2, wherein the reflector unit has a supporting portion to support the carrier.

10. The light emitting assembly as claimed in claim 2, wherein the reflector unit is a one-piece design.

11. A vehicle light, wherein the vehicle light has the light emitting assembly as claimed in claim 2.

12. A vehicle, wherein the vehicle has the light emitting assembly as claimed in claim 2.

13. The light emitting assembly as claimed in claim 1, wherein:
   the carrier has a second through hole,
   the reflector unit has a hook, and
   the hook can pass through the second through hole and hook onto the carrier.

14. The light emitting assembly as claimed in claim 1, wherein the reflector unit has a supporting portion to support the carrier.

15. The light emitting assembly as claimed in claim 1, wherein the reflector unit is a one-piece design.

16. A vehicle light, comprising the light emitting assembly as claimed in claim 1.

17. A vehicle, comprising the light emitting assembly as claimed in claim 1.

18. The light emitting assembly as claimed in claim 1, wherein:
   the carrier is plate-shaped and includes a protrusion in the form of a lug on an edge of the carrier,
   the reflector unit includes an elastic piece having a top portion, and
   a second through hole is formed in the top portion of the elastic piece to accommodate the lug.

* * * * *